United States Patent
Sinclair et al.

(10) Patent No.: US 9,951,753 B1
(45) Date of Patent: Apr. 24, 2018

(54) SYSTEMS AND METHODS FOR OFFSHORE ELECTRICAL ENERGY GENERATION

(71) Applicant: The United States of America as Represented by the Secretary of the Navy, Washington, DC (US)

(72) Inventors: Nathan A. Sinclair, Santa Barbara, CA (US); David P. Wilkinson, Ventura, CA (US); Jeffrey P. Kilpatrick, Ventura, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 79 days.

(21) Appl. No.: 15/158,815

(22) Filed: May 19, 2016

(51) Int. Cl.
| | | |
|---|---|---|
| *F01D 15/10* | (2006.01) | |
| *F02C 6/00* | (2006.01) | |
| *F03D 9/00* | (2016.01) | |
| *F01D 25/10* | (2006.01) | |
| *F01D 25/12* | (2006.01) | |

(52) U.S. Cl.
CPC ............. *F03D 9/003* (2013.01); *F01D 15/10* (2013.01); *F01D 25/10* (2013.01); *F01D 25/12* (2013.01); *F03D 9/001* (2013.01)

(58) Field of Classification Search
CPC ... F01D 15/10; F03D 9/10; F03D 9/14; F03D 9/17; F03D 9/18; F03D 9/28
USPC .............................. 290/1 C, 52; 60/325, 398
See application file for complete search history.

(56) References Cited

U.S. PATENT DOCUMENTS

2012/0119510 A1 * 5/2012 Herzen ..................... F03D 9/17
290/1 C

* cited by examiner

*Primary Examiner* — Tulsidas C Patel
*Assistant Examiner* — Thomas Quigley
(74) *Attorney, Agent, or Firm* — James M. Saunders

(57) ABSTRACT

In various embodiments, an offshore electrical energy generator is disclosed. The generator includes a buoy configured to float on a body of water. A wind turbine is mounted to the buoy. An air storage tank is configured for submersion. An air compressor is stowed within the buoy and coupled to the wind turbine and configured to charge the air storage tank in response to receiving wind energy collected by the wind turbine. An expansion turbine is stowed within the buoy and is configured to receive compressed air stored within the air storage tank and to decompress the compressed air to generate electrical energy.

9 Claims, 3 Drawing Sheets

SYSTEMS AND METHODS FOR OFFSHORE ELECTRICAL ENERGY GENERATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

1. Field

The present disclosure generally relates to electrical energy generation, and more particularly to offshore wind energy collection and storage.

2. Discussion of the Related Art

Renewable energy options are increasingly viable. In addition, certain coastal locations (e.g., coastal cities and towns) may utilize electrical energy that is generated by a land-based power plant (e.g., a coal burning or hydroelectrical power plant). However, instances may occur in which the energy requirements of the coastal location are not met, such as during a power outage or decrease in the power supply. An auxiliary or supplementary power supply is therefore desirable. Such a power supply is also, desirably, independent of any onshore or land-based power generation equipment and, further, stored in a secure (e.g., undersea) power reservoir from which power can be made available as a backup or secondary power supply.

SUMMARY

In various embodiments, an offshore electrical energy generator is disclosed. The generator can comprise a buoy configured to float on a body of water. A wind turbine is mounted to the buoy. An air storage tank is configured for submersion. An air compressor is stowed within the buoy and coupled to the wind turbine and configured to charge the air storage tank in response to receiving wind energy collected by the wind turbine. An expansion turbine stowed within the buoy is configured to receive compressed air stored within the air storage tank and to decompress the compressed air to generate electrical energy.

In various embodiments, a method of offshore electrical energy generation is disclosed. The method can comprise collecting, by an offshore, floating, wind turbine, wind energy, compressing air, by an air compressor, utilizing the collected wind energy, storing, within an air storage tank, the compressed air, and releasing, on demand, the compressed air into an expansion turbine to generate electrical energy.

BRIEF DESCRIPTION OF THE DRAWINGS

The features and advantages of the present disclosure will become more apparent from the detailed description set forth below when taken in conjunction with the drawings.

DETAILED DESCRIPTION OF THE ILLUSTRATED EMBODIMENTS

It is to be understood that the description above and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

In accordance with various embodiments, systems and methods for offshore electrical energy generation are disclosed. Certain portions of the disclosed electrical energy generating systems (e.g., power reservoirs or air storage tanks) can be submersed in secure (e.g., underwater or undersea) locations and accessed as needed, such as, for example, as a backup or secondary power supply.

The disclosed systems can include a buoy that is configured to float on a body of water, a wind turbine, which can be anchored to or mounted on a portion of the buoy that extends above the water surface, an air storage tank or power reservoir, which can be submersed and/or anchored, for example, to a seabed, an air compressor configured to receive energy collected by the wind turbine and to charge the air storage tank with compressed air, and an expansion turbine configured to receive air released from the air storage tank as a mechanism for generating electrical power. Thus, the systems disclosed herein are capable of utilizing a renewable energy resource (wind) to charge and store energy in a secure (undersea) location and to release that energy on demand, such as, for example, as a backup or secondary (supplementary) power supply. In various embodiments, the power generated by the systems for offshore electrical energy generation can provide electrical energy to a collector substation.

Figure 1:
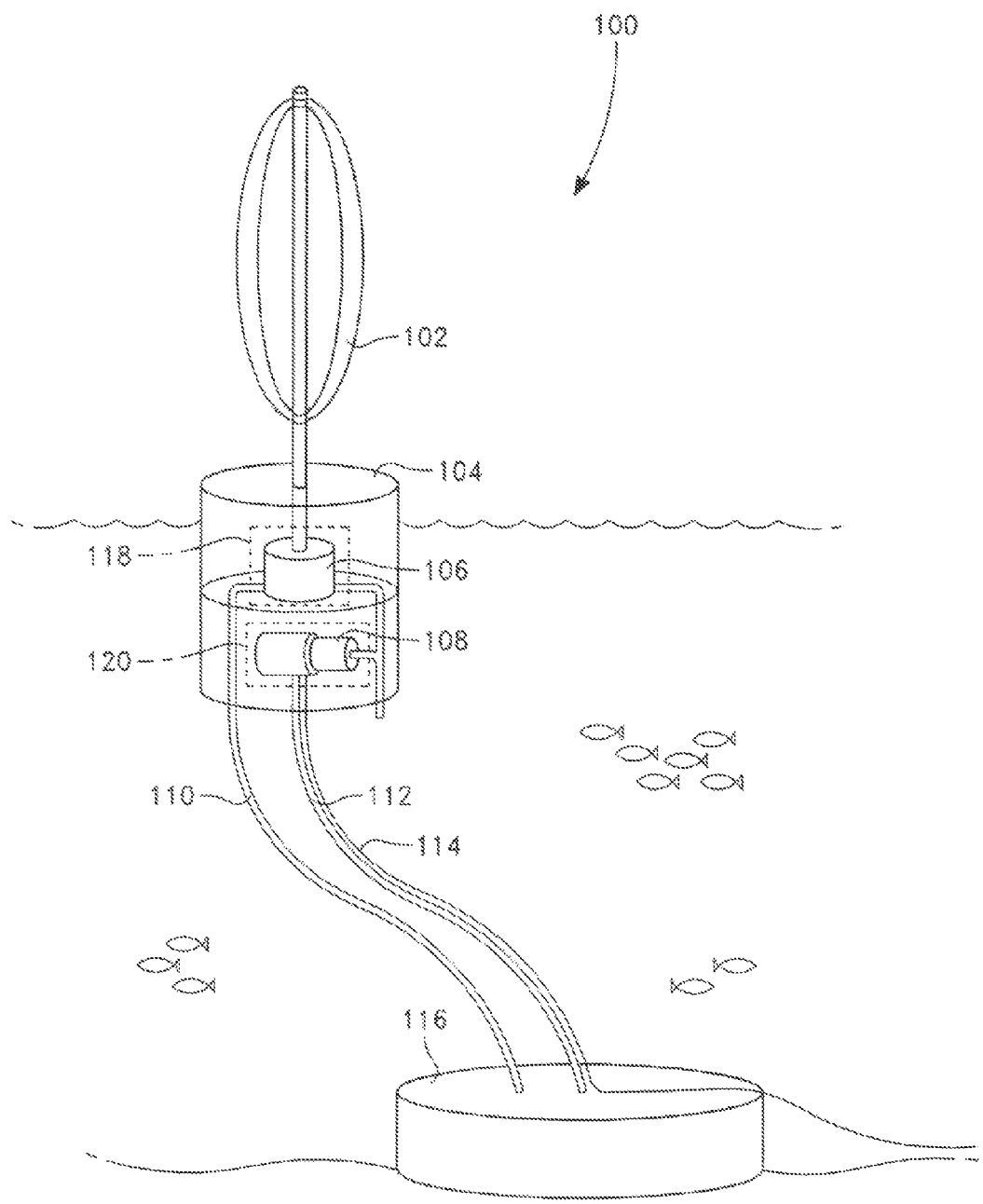
FIG. 1 is a diagram of an offshore electrical energy generating system, in accordance with various embodiments.

With reference now to FIG. 1, a diagram of an offshore electrical energy generator 100 is shown. The generator 100 can comprise a wind turbine 102, a buoy 104, an air compressor 106, an air expansion turbine 108, an air compressor line 110, an expansion turbine line 112, a power line 114, and an air storage tank 116. Alternatively, the line for the air compressor 106 and air expansion turbine 108 can be plumbed together inside the buoy 104 and proceeding down to the air storage tank. In this alternative arrangement, the reference characters shown as 110 & 112 would be a single line instead of two discrete lines. The system 100 can further include a first thermal jacket 118 and/or a second thermal jacket 120. The first thermal jacket 118 and the second thermal jacket 120 can encompass, respectively, the air compressor 106 and the air expansion turbine 108.

The wind turbine 102 can comprise any suitable type of wind turbine, such as, for example, and in various embodiments, a standing or vertical wind turbine, a propeller or bladed wind turbine, and the like. The wind turbine 102 may sometimes be referred to as a vertical wind turbine or substantially vertical wind turbine, without detracting from the merits or generalities of embodiments of the invention. The buoy 104 can comprise any suitable type of buoy, such as, for example, and in various embodiments, a spar buoy or any other type of cylindrical buoy or flotation device. The air compressor 106 can comprise any suitable type of buoy, such as, for example, and in various embodiments, any type of fan or air compression device configured to force compressed air into the air storage tank 116. The air expansion turbine 108 can comprise any suitable type of air expansion turbine configured to expand compressed air, and, resultantly, extract or generate electrical power, such as, for example, and in various embodiments a turbo expander.

The air compressor line 110 can comprise any suitable type tube configured to carry compressor air from the air compressor 108 to the air storage tank 116. The air compressor line 110 can further comprise an anchoring or mooring line, such as, for example, and in various embodiments a high tensile or high strength line or air tube configured to anchor or moor the buoy 104 to a seabed. The power line 114 can comprise any suitable type of electrical power line, such as, for example, and in various embodiments a braided, insulated, electrical power line configured to conduct electrical energy from a first point (e.g., the energy source, the air expansion turbine 108 to the destination, e.g., an onshore collector substation, as described below).

The air storage tank 116 can comprise any suitable compressed air storage tank, such as, for example, and in various embodiments a balloon or canister configured to rest under water and under water pressure and configured to be anchored to a seabed for a permanent or semi-permanent duration. When the air storage tank 116 is configured as a canister, suitable materials include concrete and galvanized steel. The first thermal jacket 118 and/or second thermal jacket 120 can comprise, in various embodiments, an envelope that is continuously flushed with seawater for exchanging heat, such as a bronze or stainless steel envelope. The continuous flushing can be achieved in several ways, including a water intake tube in conjunction with pumps (not shown in the figures for ease of view), such as impeller pumps, and water exit tube. The water intake and water exit tube can be oriented as needed, including 90 or 180 degrees orientation from each other. Power for the pumps can be from converted wind energy or power associated with the air compressor 106 and air expansion turbine 108.

The wind turbine 102 can be coupled to or mounted to the buoy 104, such as, for example, and in various embodiments, by bolting or welding the wind turbine 102 to the buoy 104. Thus, the wind turbine 102 can stand substantially vertically away from a surface of the buoy 104 to rotate in the wind blowing over the surface of the body of water upon which the buoy 104 is floating.

The air compressor 106 is mechanically coupled to the vertical wind turbine 102, such that the vertical wind turbine can, as it rotates in the wind, generate and transfer mechanical power to the air compressor 106 for operation of the air compressor. In other words, the wind turbine 102 can supply mechanical power directly to the air compressor 106.

The buoy 104 can be coupled to the air storage tank 116 by way of the air compressor line 110. The air compressor line 110 can, as described above, comprise an air conduit or air tube through which compressed air can be pumped from the air compressor 106 into the air storage tank 116 to fill or charge the air storage tank with a reserve of compressed air. The air compressor line 110 can also anchor or moor the buoy 104 to the air storage tank 116.

Compressed air can further, in various embodiments, be released or discharged from the air storage tank 116, through the expansion turbine line 112, and into the air expansion turbine 108. Alternatively, and in various embodiments, the air compressor line 110 can comprise a two-way, partitioned line through which air can pass simultaneously from the air compressor 106 to the air storage tank 116 as well as from the air storage tank 116 to the air expansion turbine 108.

Figure 2:
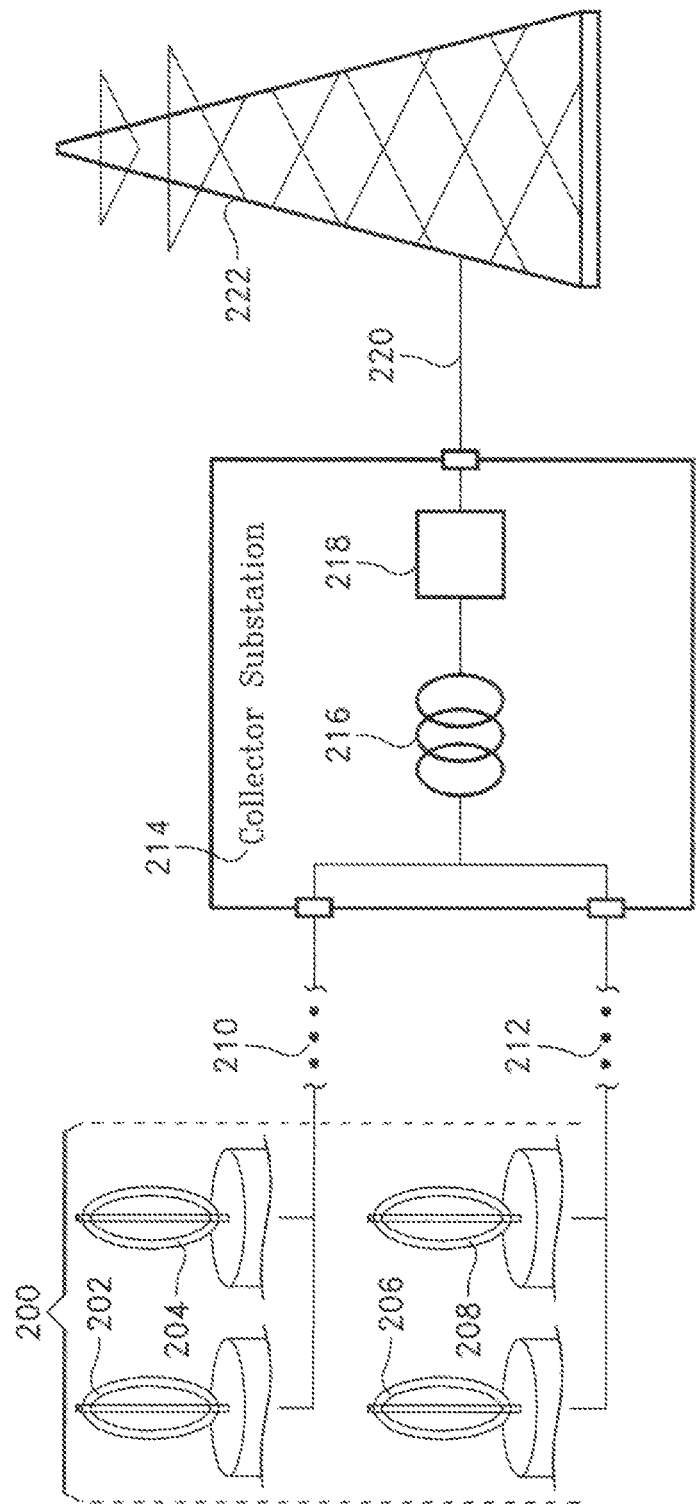
FIG. 2 is a diagram of an offshore electrical energy generating system electrically coupled to an onshore power collecting substation, in accordance with various embodiments.

With reference to FIG. 2, an offshore electrical energy generating system 200 electrically coupled to an onshore power collecting substation 214 is shown. In various embodiments, the offshore electrical energy generating system 200 can comprise any suitable number of offshore electrical energy generators, such as, for example, generators 202, 204, 206, and/or 208. Thus, the system 200 may be described as having in some embodiments "a generator," in other embodiments "at least one generator," and in other embodiments "a plurality of generators." Other embodiments may have "four generators" or "at least four generators." Furthermore, additional embodiments may refer to the system as employing "a generator bank." Each generator 202, 204, 206, and/or 208 can comprise a generator like the generator 100 described above. Each of the generators 202, 204, 206, and/or 208 can be coupled, e.g., via an offshore (undersea) power line, e.g., power lines 210 and/or 212, to a collector substation 214.

The collector substation 214 can be disposed on land. The collector substation 214 can comprise, in various embodiments, a substation transformer 216 and/or a circuit breaker 218. The substation transformer 216 can be electrically coupled to the incoming power lines 210 and/or 212 as well as to the circuit breaker 218. The substation transformer 216 can upconvert and/or downconvert the frequency of incoming electrical power for transmission, via an outgoing power line 220, to an electrical power line carrying structure 222. The structure 222 can distribute electrical power, as needed, throughout an electrical grid.

Figure 3:
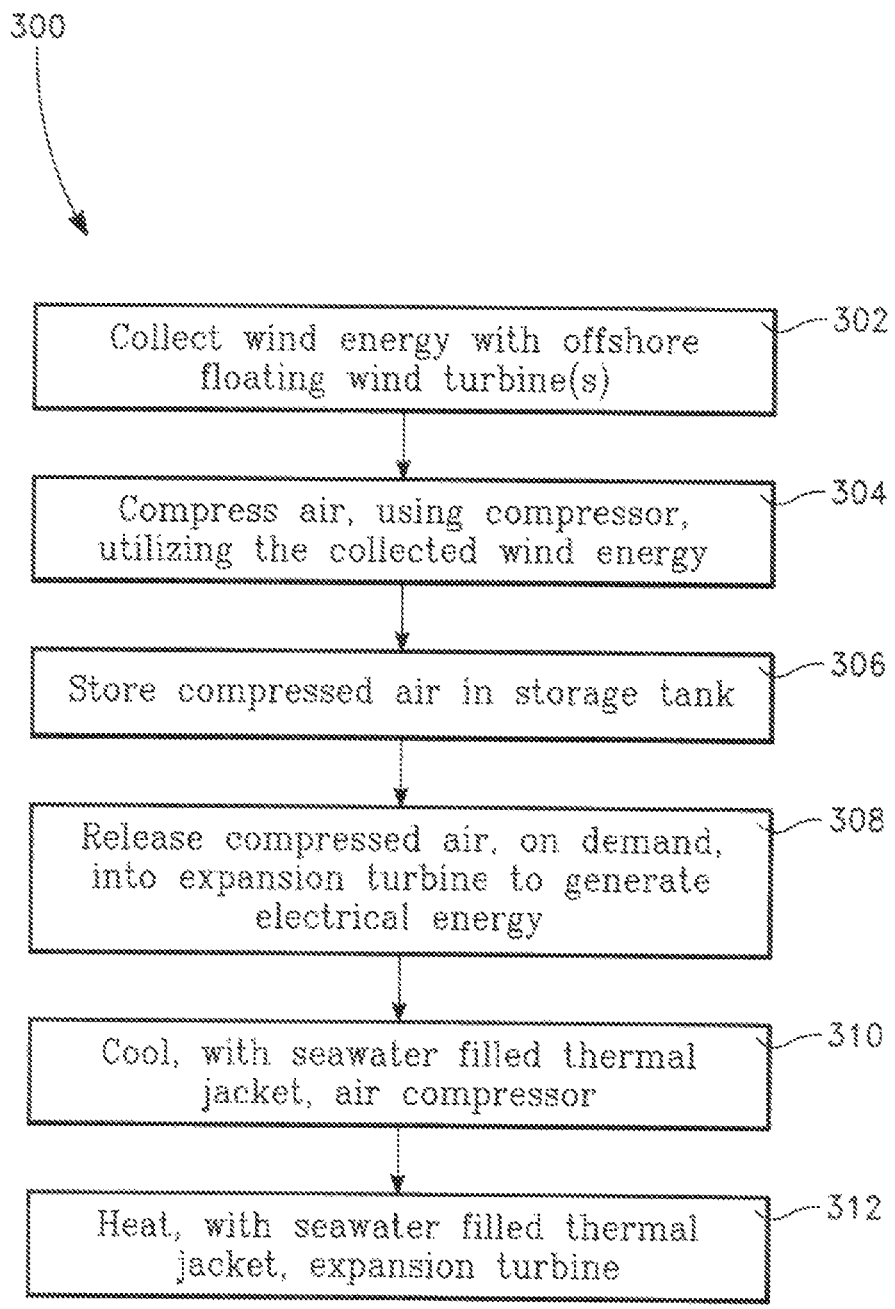
FIG. 3 is a flowchart describing a process for offshore electrical energy generation, in accordance with various embodiments.

Thus, in operation, and with reference to FIG. 3, a process 300 for offshore electrical energy generation is shown. In various embodiments, the one or more electrical power generators (e.g., generators 202, 204, 206, and/or 208) can collect wind energy, as described above (step 302). In particular, a wind turbine (e.g., wind turbine 102) can rotate in the wind to supply mechanical energy to an air compressor (e.g., air compressor 106). The air compressor can compress air and pump the compressed air into an air storage tank (e.g., air storage tank 116), where the air can be stored and maintained at a desirable pressure by a surrounding water pressure (steps 304 and 306).

In response to a signal received, for example, from a land based power grid operations center (not shown), the air storage tank can release compressed air to an air expansion turbine (e.g., the air expansion turbine 108), which can decompress the received air to generate electrical energy (step 308). This electrical energy can be supplied to a collector substation (e.g., collector substation 214), which can supply the (transformed) electrical energy to an offsite power grid via one or more outgoing power lines.

In various embodiments, electrical energy can be supplied to the collector substation 214 based upon a load experienced by the electrical power grid to which the collector substation 214 is coupled. That is, the collector substation 214 can receive electrical energy from one or more generators (e.g., generators 202, 204, 206, and/or 208) based upon an electrical load place upon the electrical grid. Thus, a voltage difference experienced at the collector substation 214 can, in some embodiments, cause a control signal requesting power being transmitted from the collector substation to one or more of the generators (reference characters 202, 204, 206, and/or 208). Accordingly, the offshore electrical energy generating system 200 can follow the load placed on an associated power grid.

Referring to steps 310 and 312, in various embodiments, the air compressor 106 can generate, as a byproduct, heat energy, as it operates to compress air. Similarly, the air expansion turbine 108 can, during operation, absorb heat such that it cools to a significantly reduced (and potentially undesirable) temperature. To mitigate both of these factors, the air compressor 106 can be enclosed or enveloped within a first thermal jacket 118, and the air expansion turbine 108 can be enclosed or enveloped within a second thermal jacket 120. Both of the first thermal jacket 118 and the second thermal jacket 120 can be filled with seawater, which has a high specific heat, such that the first thermal jacket 118 acts as a heat sink for the air compressor 106, while the second thermal jacket as a heater or heat supply for the air expansion turbine 108.

Thus, the systems disclosed herein are capable of utilizing a renewable energy resource (wind) to charge and store energy in a secure (undersea) location and to release that energy on demand, such as, for example, as a backup or secondary (supplementary) power supply to a land (or sea) based power grid.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An offshore electrical energy generator, comprising:
   a buoy configured to float on a body of seawater;
   a wind turbine mounted to said buoy;
   an air storage tank configured for submersion;
   an air compressor stowed within said buoy and coupled to said wind turbine, said air compressor configured to charge said air storage tank in response to receiving wind energy collected by said wind turbine; and
   an expansion turbine stowed within said buoy, said expansion turbine configured to receive compressed air stored within said air storage tank and to decompress the compressed air to generate electrical energy;
   a first thermal jacket configured to enclose and cool said air compressor, wherein said first thermal jacket is a bronze or stainless steel envelop;
   a second thermal jacket configured to enclose and heat said expansion turbine, wherein said second thermal jacket is a bronze or stainless steel envelop;
   wherein said heating and cooling is by continuously flushing said first thermal jacket and said second thermal jacket with seawater during operation.

2. The offshore electrical energy generator according to claim 1, wherein said air storage tank comprises a balloon.

3. The offshore electrical energy generator according to claim 1, wherein said air storage tank is configured to be anchored to a seabed.

4. An offshore electrical energy generating system, comprising:
   a plurality of generators;
   wherein each generator in said plurality of generators further comprising:
   a buoy configured to float on a body of seawater;
   a wind turbine mounted to said buoy;
   an air compressor stowed within said buoy and coupled to said wind turbine, said air compressor configured to charge an undersea air storage tank in response to receiving wind energy collected by said wind turbine; and
   an expansion turbine stowed within said buoy, said expansion turbine configured to receive compressed air stored within said undersea air storage tank and to decompress the compressed air to generate electrical energy;
   a first thermal jacket configured to enclose and cool said air compressor, wherein said first thermal jacket is a bronze or stainless steel envelop;
   a second thermal jacket configured to enclose and heat said expansion turbine, wherein said second thermal jacket is a bronze or stainless steel envelop;
   wherein said heating and cooling is by continuously flushing said first thermal jacket and said second thermal jacket with seawater during operation.

5. The offshore electrical energy generating system according to claim 4, wherein said plurality of generators is four generators.

6. The offshore electrical energy generating system according to claim 4, further comprising a collector substation to which said expansion turbine is electrically-coupled and to which said expansion turbine supplies electrical energy.

7. The offshore electrical energy generating system according to claim 6, wherein said expansion turbine supplies electrical energy to said collector substation in response to an electrical load on said collector substation.

8. The offshore electrical energy generating system according to claim 6, wherein said expansion turbine is electrically-coupled to said collector substation by way of an undersea power line.

9. A method of offshore electrical energy generation, comprising:
   collecting wind energy with an offshore, floating wind turbine;
   compressing air, by an air compressor, utilizing the collected wind energy;
   storing, within an air storage tank, the compressed air,
   wherein a first thermal jacket encloses said air compressor, wherein said first thermal jacket is a bronze or stainless steel envelop;
   releasing, on demand, the compressed air into an expansion turbine;
   wherein a second thermal jacket encloses said expansion turbine, wherein said second thermal jacket is a bronze or stainless steel envelop;
   cooling said air compressor during operation by continually flushing said first thermal jacket with seawater;
   heating said expansion turbine during operation by continually flushing said second thermal jacket with seawater;
   wherein said releasing task generates electrical energy.

* * * * *